US008120576B2

(12) United States Patent
Kita et al.

(10) Patent No.: US 8,120,576 B2
(45) Date of Patent: Feb. 21, 2012

(54) INPUT DISPLAY DEVICE, DISPLAY CONTROL METHOD AND CONTROL PROGRAM FOR ALLOWING A CURSOR TO SHIFT TO A SELECTABLE POSITION

(75) Inventors: Masanori Kita, Gunma (JP); Tsuyoshi Kawai, Gunma (JP)

(73) Assignee: SANYO Electric Co., Ltd., Moriguchi-shi (JP)

( * ) Notice: Subject to any disclaimer, the term of this patent is extended or adjusted under 35 U.S.C. 154(b) by 1163 days.

(21) Appl. No.: 11/872,449

(22) Filed: Oct. 15, 2007

(65) Prior Publication Data
US 2008/0088585 A1     Apr. 17, 2008

(30) Foreign Application Priority Data

Oct. 17, 2006   (JP) ................................ 2006-282243

(51) Int. Cl.
G06F 3/033 (2006.01)
(52) U.S. Cl. ..................................................... 345/157
(58) Field of Classification Search .................. 345/157; 715/224–226; 710/67
See application file for complete search history.

(56) References Cited

U.S. PATENT DOCUMENTS

| 5,136,506 A * | 8/1992 | Toshiyuki ...................... 345/159 |
| 5,953,541 A * | 9/1999 | King et al. ....................... 710/67 |
| 2004/0199274 A1* | 10/2004 | Hegmann et al. ............... 700/83 |

FOREIGN PATENT DOCUMENTS

JP     01-291085 A     11/1989

OTHER PUBLICATIONS

Japanese Office Action dated Jan. 25, 2011, issued in corresponding Japanese Patent Application No. 2006-282243.

* cited by examiner

*Primary Examiner* — Richard Hjerpe
*Assistant Examiner* — Andrew Schnirel
(74) *Attorney, Agent, or Firm* — Westerman, Hattori, Daniels & Adrian, LLP

(57) ABSTRACT

An input display device, and a cursor shift record concerning a cursor shift operation which is carried out on the display unit in connection with the selection of the processing target candidates, a timer for counting the time from a previous processing target search/select operation till a latest cursor shift operation, and a cursor shift controller for judging on, the basis of the processing target search/select record, the cursor shift record and the time counted by the timer whether the latest cursor shift operation is carried out in connection with the same processing to be executed on processing targets, and allowing the cursor to shift to a selectable position of a next processing target candidate if it is judged that the latest cursor shift operation is carried out in connection with the same processing.

11 Claims, 7 Drawing Sheets

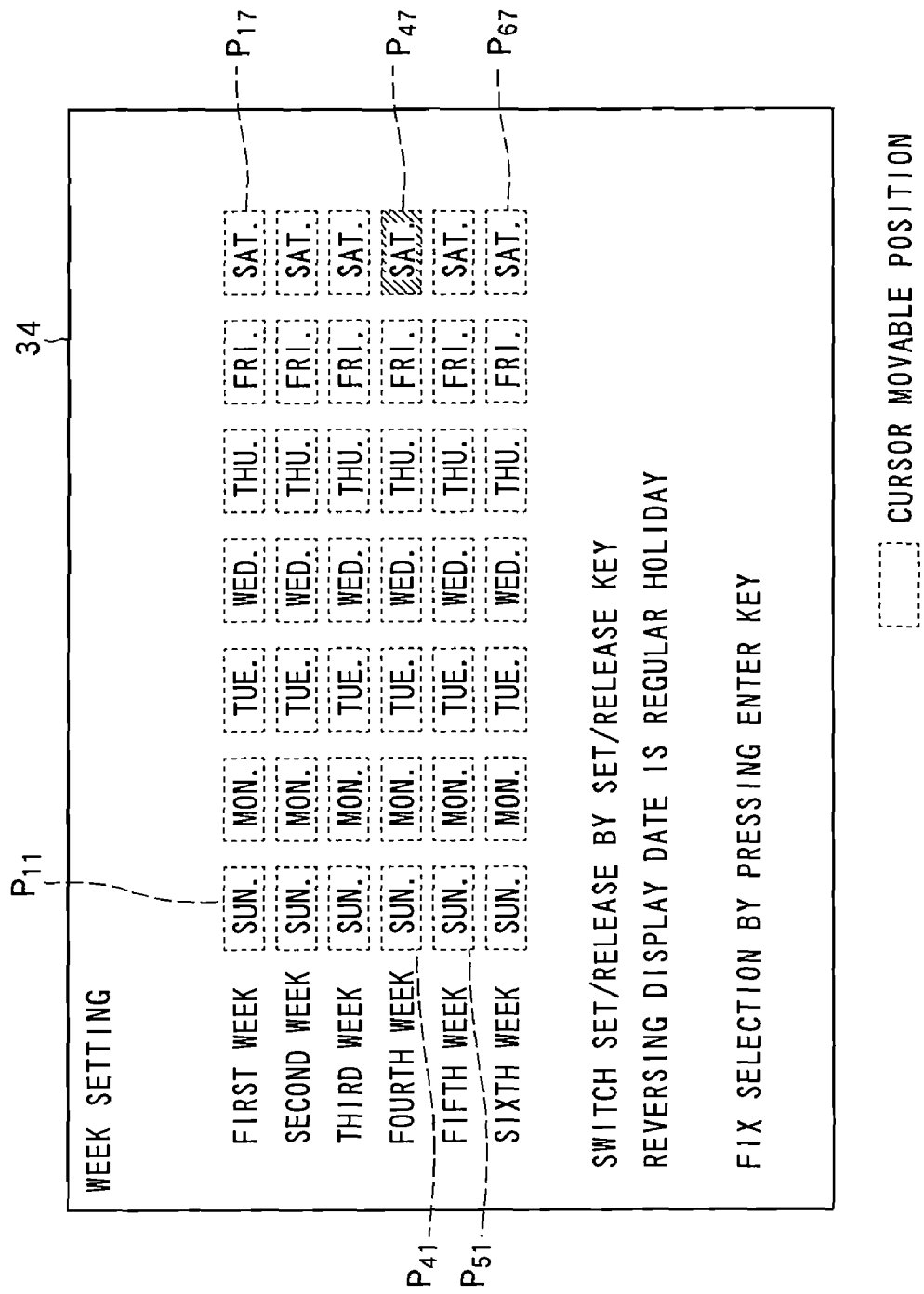

INPUT DISPLAY DEVICE, DISPLAY CONTROL METHOD AND CONTROL PROGRAM FOR ALLOWING A CURSOR TO SHIFT TO A SELECTABLE POSITION

INCORPORATION BY REFERENCE

The present application claims priority under 35 U.S.C. §119 to Japanese Patent Application No. 2006-282243 filed on Oct. 17, 2006. The content of the application is incorporated herein by reference in its entirety.

BACKGROUND OF THE INVENTION

1. Field of the Invention

The present invention relates to an input display device, a display control method and a control program, and particularly to an input display device, a display control method and a control program in an information processing device for selecting a data input position or a processing target by using a cursor.

2. Background of the Invention

A controller for concentrically controlling refrigeration apparatuses such as show cases, etc. is designed to collectively input set values required for the respective operations of a number of refrigeration apparatuses in a lump, thereby controlling the operation of each refrigeration apparatus (for example, see JP-A-1-291085).

Therefore, a general controller is equipped with a data display unit constructed by a liquid crystal display for displaying various kinds of information, and key switches for carrying out various kinds of input setting.

Here, when processing targets are displayed in the form of a grid (or in the matrix arrangement) on a display screen, at least four key switches of "up", "down", "left", "right" are provided as the key switches, and the cursor on the display screen can be successively shifted to a processing target on the display screen by operating the key switches. Furthermore, selection of a display item (containing processing targets), release of selection, renewal of a display content or the like is carried out by using another operation key.

There exist various kinds of input setting to be carried out in a controller, and under many situations, serial numbers are respectively allocated to a plurality of refrigeration apparatuses and the same setting is repetitively carried out on these refrigeration apparatuses in the increasing or decreasing order of the serial numbers.

When the serial numbers of these refrigeration apparatuses are displayed on a display screen under such a situation, the numbers of all the refrigeration apparatuses are not necessarily displayed on a line. For example, these serial numbers may be displayed in the form of a grip (or in the matrix arrangement). In this case, in order to shift a cursor to the position of a desired processing target (for example, a refrigeration apparatus of a desired serial number) on the display screen under such a situation that the cursor is initially displayed at one end portion (for example, right end portion) on the display screen, a user must first shift the cursor to the other end portion side (for example, the left end portion side) on the same line by successively pressing the "left" key switch and further shift the cursor in a direction (for example, vertical direction) perpendicular to the cursor shift direction (right-and-left direction) by pressing the "up" or "down" key switch to select the desired processing target (the refrigeration apparatus of the desired serial number). That is, the user must shift the cursor to the desired processing target by pressing at least two key switches several times. Accordingly, the selecting work of the desired processing target on the display screen by using the cursor is cumbersome for users.

SUMMARY OF THE INVENTION

Therefore, an object of the present invention is to provide an input display device, a display control method and a control program with which a cursor can be automatically moved to a next desired processing target candidate selectable position on a screen for selecting a processing target when the same processing is continuously executed on plural processing targets, thereby simplifying user's operation and enhancing the processing efficiency.

In order to attain the above object, according to a first aspect of the present invention, an input display device for enabling a user to input various kinds of information by using a cursor and displaying an input state on a display unit, comprises: an operation record storing unit for storing a processing target search/select record concerning selection of processing target candidates, and a cursor shift record concerning a cursor shift operation which is carried out on the display unit in connection with the selection of the processing target candidates; a timer for counting the time from a previous processing target search/select operation till a latest cursor shift operation; and a cursor shift controller for judging on the basis of the processing target search/select record, the cursor shift record and the time counted by the timer whether the latest cursor shift operation is carried out in connection with the same processing to be executed on processing targets, and allowing the cursor to shift to a selectable position of a next processing target candidate if it is judged that the latest cursor shift operation is carried out in connection with the same processing.

In the above input display device, selectable positions of the cursor for the processing target candidates are arranged in the form of a grid, and when the cursor is shifted in a first shift direction on the display unit and the latest cursor shift operation in the first shift direction is carried out under the state that the cursor is located at one end position in the first shift direction on the display unit, the cursor shift controller automatically shifts the cursor to the other end position in the first shift direction on the display unit and further shift the cursor in a second direction crossing the first shift direction by one step so that the cursor is allowed to be located at a selectable position of a next processing target candidate when it is judged that the latest cursor shift operation is carried out in connection with the same processing.

In the above input display device, the cursor shift controller automatically shifts the cursor to the other end position in the first shift direction on the display unit so that the cursor is allowed to be located at a selectable position of a processing target candidate for different processing when it is judged that the latest cursor shift operation is not carried out in connection with the same processing.

In the above input display device, the cursor shift controller compares the time counted by the timer with a predetermined time, and judges that the latest cursor shift operation is carried out in connection with the same processing to be executed on processing targets when the time counted by the timer is within the predetermined time.

In the above input display device, the previous processing target search/select operation is any one of a last cursor shift operation and a last selecting operation of a processing target candidate.

According to a second aspect of the present invention, a display control method for an input display device for enabling a user to input various kinds of information by using a cursor and displaying an input state on a display unit, comprises: an operation record storing step for storing a processing target search/select record concerning selection of processing target candidates, and a cursor shift record concerning a cursor shift operation which is carried out on the display unit in connection with the selection of the processing target candidates; a time counting step for counting the time from a previous processing target search/select operation till a latest cursor shift operation; and a cursor shift controlling step for judging on the basis of the processing target search/select record, the cursor shift record and the time counted in the time counting step whether the latest cursor shift operation is carried out in connection with the same processing to be executed on processing targets, and allowing the cursor to shift to a selectable position of a next processing target candidate if it is judged that the latest cursor shift operation is carried out in connection with the same processing.

In the above display control method, the selectable positions of the cursor for the processing target candidates are arranged in the form of a grid, and when the cursor is shifted in a first shift direction on the display unit and the latest cursor shift operation in the first shift direction is carried out under the state that the cursor is located a tone end position in the first shift direction on the display unit, the cursor is automatically shifted to the other end position in the first shift direction on the display unit and further shifted in a second direction crossing the first shift direction by one step so that the cursor is allowed to be located at a selectable position of a next processing target candidate when it is judged that the latest cursor shift operation is carried out in connection with the same processing.

In the above display control method, the cursor is automatically shifted to the other end position in the first shift direction on the display unit so that the cursor is allowed to be located at a selectable position of a processing target candidate for different processing when it is judged that the latest cursor shift operation is not carried out in connection with the same processing.

In the above input display method, the time counted in the time counting step is compared with a predetermined time, and it is judged that the latest cursor shift operation is carried out in connection with the same processing to be executed on processing targets when the time counted by the timer is within the predetermined time.

In the above input display method, the previous processing target search/select operation is any one of a last cursor shift operation and a last selecting operation of a processing target candidate.

According to a third aspect of the present invention, a control program for enabling a computer control an input display device for enabling a user to input various kinds of information by using a cursor and displaying an input state on a display unit, comprises: storing a processing target search/select record concerning selection of processing target candidates, and a cursor shift record concerning a cursor shift operation which is carried out on the display unit in connection with the selection of the processing target candidates; counting the time from a previous processing target search/select operation till a latest cursor shift operation; and judging on the basis of the processing target search/select record, the cursor shift record and the time counted in the time counting step whether the latest cursor shift operation is carried out in connection with the same processing to be executed on processing targets, and allowing the cursor to shift to a selectable position of a next processing target candidate if it is judged that the latest cursor shift operation is carried out in connection with the same processing.

In the above control program, selectable positions of the cursor for the processing target candidates are arranged in the form of a grid, and when the cursor is shifted in a first shift direction on the display unit and the latest cursor shift operation in the first shift direction is carried out under the state that the cursor is located at one end position in the first shift direction on the display unit, the cursor is automatically shifted to the other end position in the first shift direction on the display unit and further shifted in a second direction crossing the first shift direction by one step so that the cursor is allowed to be located at a selectable position of a next processing target candidate when it is judged that the latest cursor shift operation is carried out in connection with the same processing.

According to the present invention, when the same processing is sequentially executed on processing targets, on the basis of the processing target search/select record, the cursor shift record and the time interval between the subsequent operations, the controller can automatically shift the cursor to a selectable position of a next processing target candidate while estimating a user's intention of the cursor shift operation in advance, thereby simplifying the key operation for the user and enhancing the efficiency of the processing.

BRIEF DESCRIPTION OF THE DRAWINGS

FIG. 7 is a diagram showing a processing target search/select operation in individual setting.

DETAILED DESCRIPTION OF THE PREFERRED EMBODIMENT

A preferred embodiment according to the present invention will be described hereunder with reference to the accompanying drawings.

Figure 1:
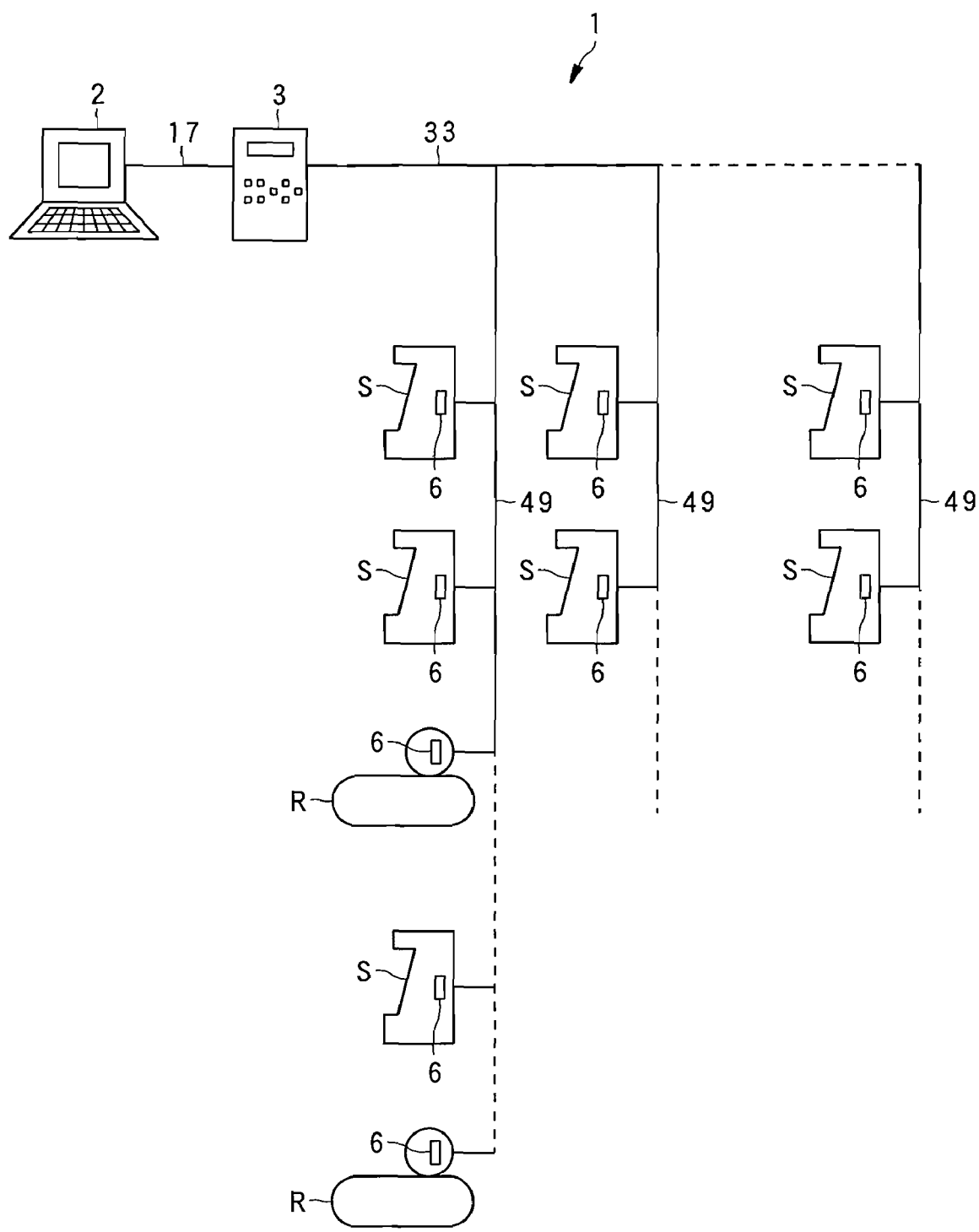
FIG. 1 is a diagram showing the construction of a central managing system according to an embodiment of the present invention.

FIG. 1 is a diagram showing the construction of a central managing system according to an embodiment of the present invention.

The central managing system 1 is equipped with a central managing device 2 constructed as a personal computer, a main controller 3 constructed by a microcomputer, and terminal side controllers 6 provided to respective show cases, etc.

Figure 2:
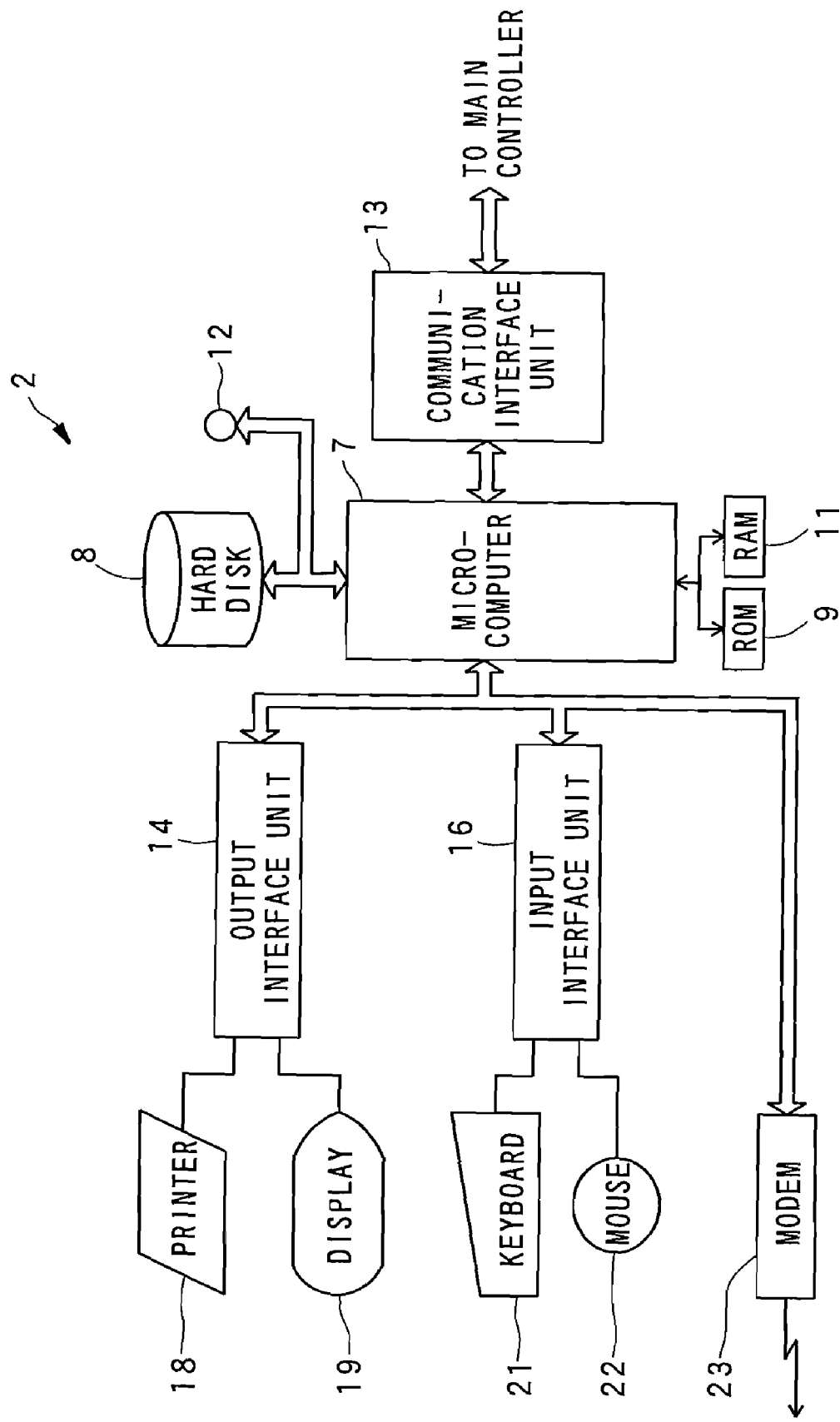
FIG. 2 is a block diagram showing the construction of a central managing device.

FIG. 2 is a block diagram showing the construction of the central managing device 2.

The central managing device 2 is provided in a security guards room or the like in a shop or the like, and it has a microcomputer 7 for controlling the whole of the central managing device 2 concerned, a hard disk (external storage device) 8 that is connected to the microcomputer 7, has a large storage capacity and stores various kinds of information, ROM 9 that is connected to the microcomputer 7 and stores a control program, RAM 11 that is connected to the microcomputer 7 and temporarily stores various kinds of data, a disk drive 12 for reading/writing data from/into a flexible disk as a removable storage medium, an optical disk or the like, a communication interface unit 13 for executing the communication with the main controller 3, an output interface unit 14 for carrying out the interface operation with external output equipment, and an input interface unit 16 for carrying out the interface operation with external input equipment.

Here, in the hard disk 8 are stored not only the control program of the central managing device 2 itself, but also various kinds of data transmitted from the main controller 3, data concerning the setting style of show cases S or the like as described later (case layout), data concerning various kinds of operation conditions, a communication protocol, etc.

The communication interface unit 13 is constructed by a serial interface, for example, and it is connected to the main controller 3 described above through a communication line 17. The output interface unit 14 is connected to a printer 18 and a display 19 as external output equipment. The input interface unit 16 is connected to a keyboard 21 and a mouse 22 as external input equipment.

Figure 3:
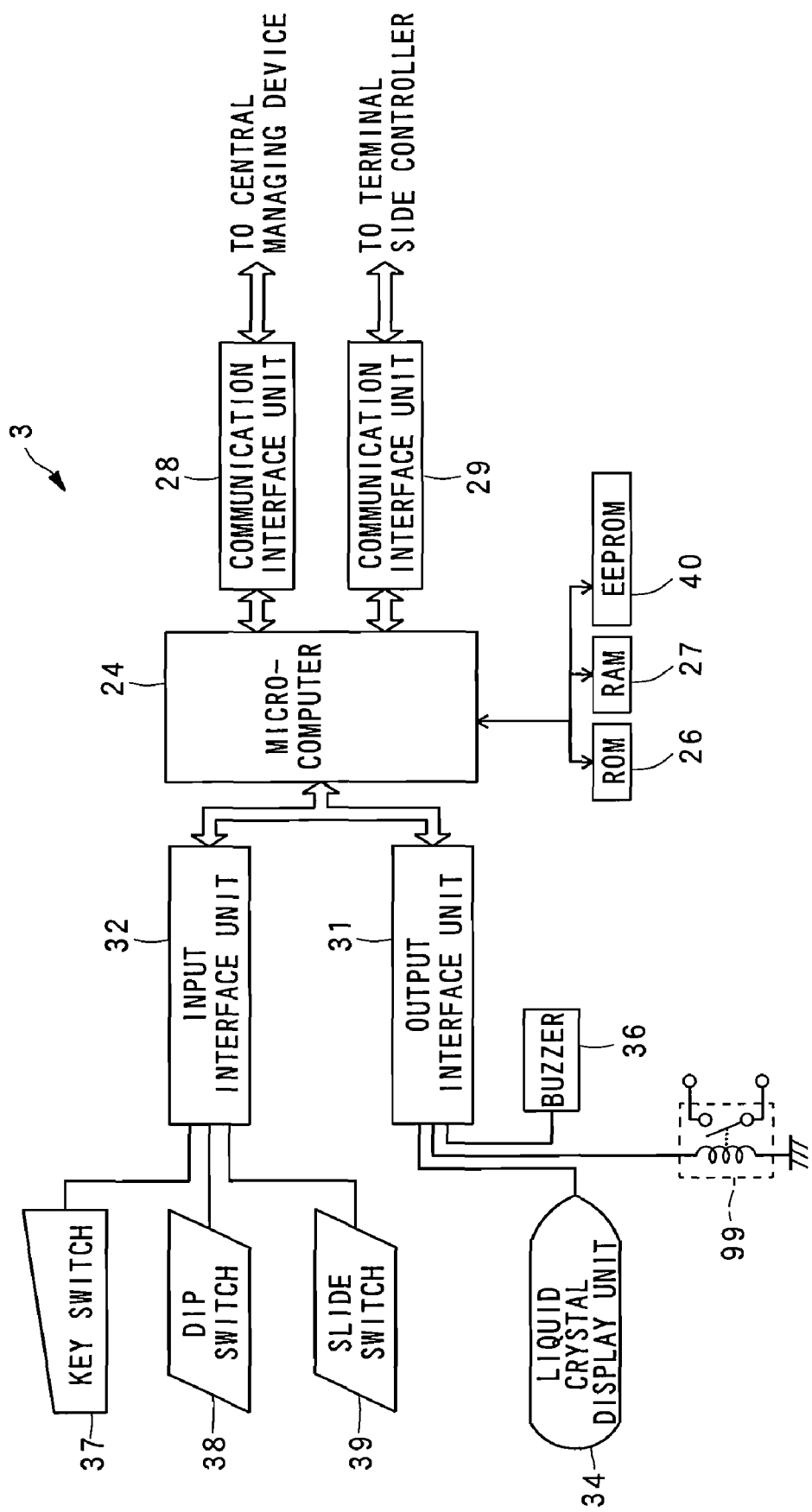
FIG. 3 is a block diagram showing the construction of a main controller.

FIG. 3 is a block diagram showing the construction of the main controller.

The main controller 3 is also disposed in a security guards room or the like. As shown in FIG. 3, the main controller 3 is constructed by a microcomputer 24 for controlling the whole of the main controller 3, ROM 26 and RAM 27 connected to the microcomputer 24, communication interface units 28 and 29, an output interface unit 31 and an input interface unit 32, and EEPROM 40 connected to the microcomputer 24.

In ROM 26 are temporarily stored a communication protocol and a control program for the main controller 3 itself. In RAM 27 is stored various kinds of data transmitted from an external device, various kinds of data transmitted to the external device, and control data of the main controller 3 itself (for example, display data of the liquid crystal display unit 34 described later, etc.).

The communication interface units 28, 29 are constructed as serial interfaces. Here, the communication interface unit 28 is connected to the central managing device 2 through the communication line 17, and the communication interface unit 29 is connected to the terminal side controller 6 through the communication line 33. Furthermore, the communication interface unit 29 has six communication ports, for example, so that terminal side controllers 6 of six systems at maximum can be connected.

A liquid crystal display unit 34, an external alarm output unit 99 having a relay contact output and a buzzer 36 are connected to the output interface unit 31. Furthermore, key switches 37, a dip switch 38 and a slide switch 39 are connected to the input interface unit 32. The key switches are switches for carrying out various kinds of setting described later and a display instruction. The dip switch 38 is a switch for setting various kinds of states. The slide switch 39 is a switch for performing illumination control of a show case S, etc. described later and setting associated with nighttime stop. Data concerning various kinds of settings and setting states of the show cases S, etc. are stored in EEPROM 40, and these data are held in EEPROM 40 even when power to EEPROM 40 is shut out.

Figure 4:
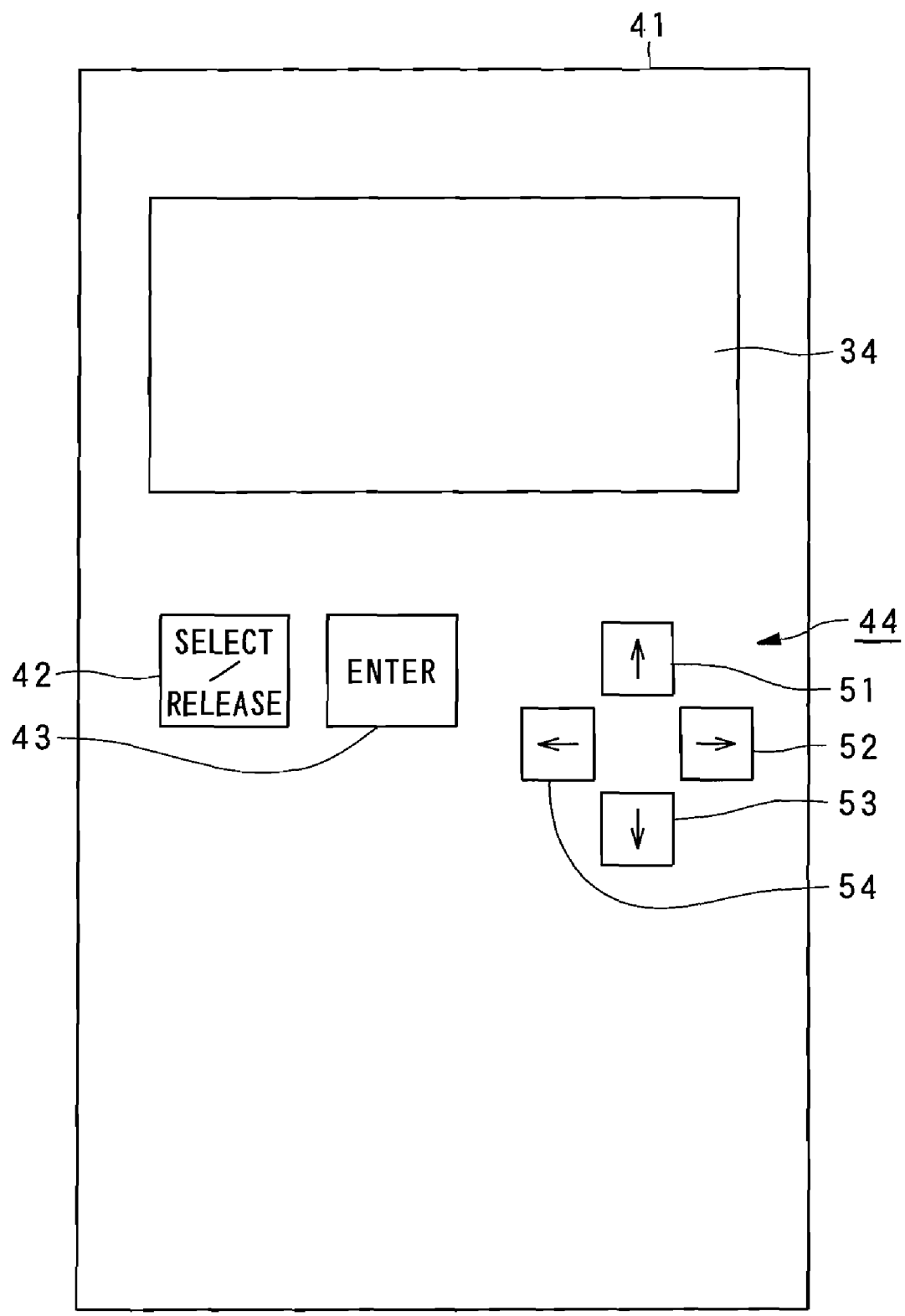
FIG. 4 is a diagram showing the outlook of the main controller.

FIG. 4 is a diagram showing the outlook of the main controller.

The main controller 3 is equipped with a box-shaped main body 41, the liquid crystal display unit 34 provided to the main body 41, a select/release key 42 constituting the key switches 37, an enter key 43 for fixing a selected state, and scroll keys (cursor shift keys) 44 for shifting the cursor and inputting various kinds of set values.

Here, the scroll keys 44 contain an upward cursor shift key 51 for shifting the cursor upwardly, a rightward cursor shift key 52 for shifting the cursor in the rightward direction, a downward cursor shift key 53 for shifting the cursor downwardly, and a leftward cursor shift key 54 for shifting the cursor in the leftward direction.

Figure 5:
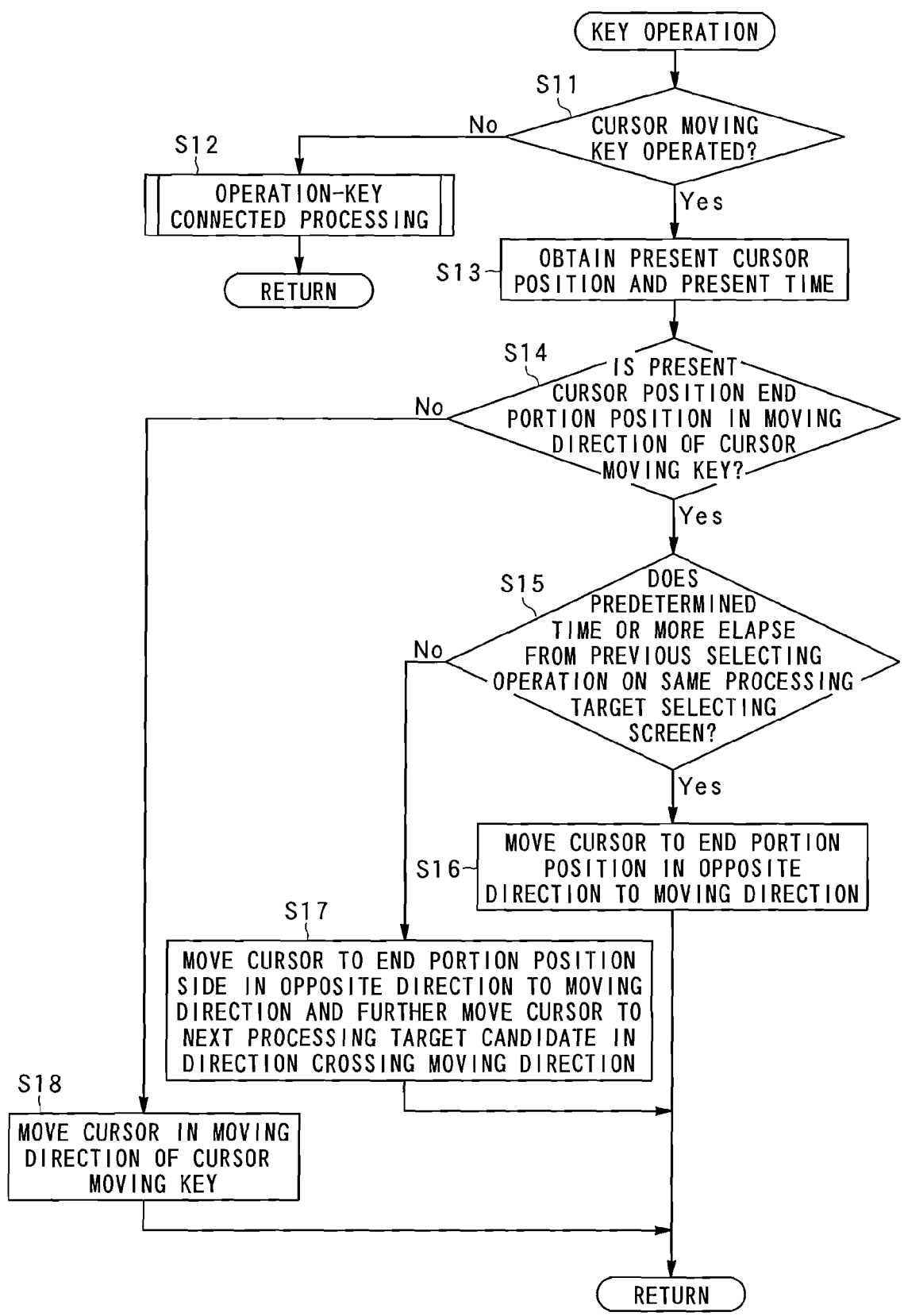
FIG. 5 is a processing flowchart in a key operation of the main controller.

FIG. 5 is a processing flowchart in the key operation of the main controller.

When a key operation is carried out (for example, any key switch is operated by press, touch or the like), the microcomputer 24 of the main controller 3 identifies whether the operated key is the cursor shift key or not (step S11). If in step S11 it is judged that the operated key is a key other than the cursor shift key (step S11; No), the microcomputer 24 executes the processing corresponding to the operated key (step S12), and then returns the processing to the main processing routine (not shown).

If in step S11 it is judged that the operated key is any cursor shift key (step S11; Yes), the present cursor position and the present time (key operation time) are obtained (step S13). These data are temporarily stored in RAM or the like.

Next, the microcomputer 24 judges whether the present position of the cursor is any end position in any cursor shift direction on the display screen (step S14).

For example, when the cursor shift key is the leftward cursor shift key 52 for shifting the cursor to the right side, the microcomputer 24 also judges whether the present cursor position is the rightward end position or not. If the cursor shift key is the downward cursor shift key 53 for shifting the cursor downwardly, the microcomputer 24 also judges whether the present cursor position is the downward end position.

If in step S14 it is judged that the present position of the cursor is not the end position in any cursor shift direction (step S13; No), the microcomputer 24 shifts the cursor in the shift direction of the cursor shift key (step S18), and returns the processing to the main processing routine (not shown).

If in step S14 it is judged that the present cursor position is the end position concerned in the cursor shift direction (step S14; Yes), the microcomputer 24 judges whether a predetermined time or more elapses from a previous processing target search/select operation (for example, the key press operation of the select/release key 42) on the same processing target search/select screen as the present processing target search/select screen (step S15). That is, it is judged whether the operation being carried out at present is contained in a series of setting processing which the user is carrying out.

If in step S15 it is judged that the predetermined time or more does not elapse from the previous processing target search/select operation on the same processing target search/select screen as the present processing target search/select screen (step S15; No), it is estimated that the operation (press operation) concerned is contained in the series of setting processing which the user is carrying out. In order to shift the cursor to a next processing target candidate, the cursor is shifted to the end position in the opposite direction to the cursor shift direction and further shifted in a direction crossing (perpendicular to) the cursor shift direction in which the next processing target candidate exists (step S17), and returns the processing to the main processing routine (not shown).

Here, the operation of "shifting the cursor to the end position in the opposite direction to the cursor shift direction and also in the direction crossing the shift direction in which the next processing target candidate is located" will be described.

In this case, it is assumed that processing target candidates are arranged in the form of a grid. For example, when the cursor shift key is the rightward cursor shift key 52 for shifting the cursor to the right side, the cursor is shifted to the leftward end position, and also shifted to a direction crossing the rightward direction corresponding to the shift direction, that is, in the vertical direction in which the next processing target candidate is located. In more detail, when the processing is executed from the upper side to the lower side, the cursor is shifted to the lower line by one step at the time point when the cursor reaches the rightward end portion.

If in step S15 it is judged that the predetermined time or more elapses from the previous processing target search/select operation (specifically, some processing target is selected by pressing the select/release key 42) on the same processing target search/select screen as the present processing target search/select screen (step S15; Yes), it is estimated that the operation concerned is not contained in the series of processing which the user is carrying out, the cursor is shifted to the end position in the opposite direction to the present shift direction (step S16), and the processing is shifted to the main processing routine (not shown). Accordingly, when the cursor shift key is the rightward cursor shift key 52 for shifting the cursor rightward, the cursor is shifted to the leftward end position without further shifting the cursor upwardly or downwardly.

Figure 6:
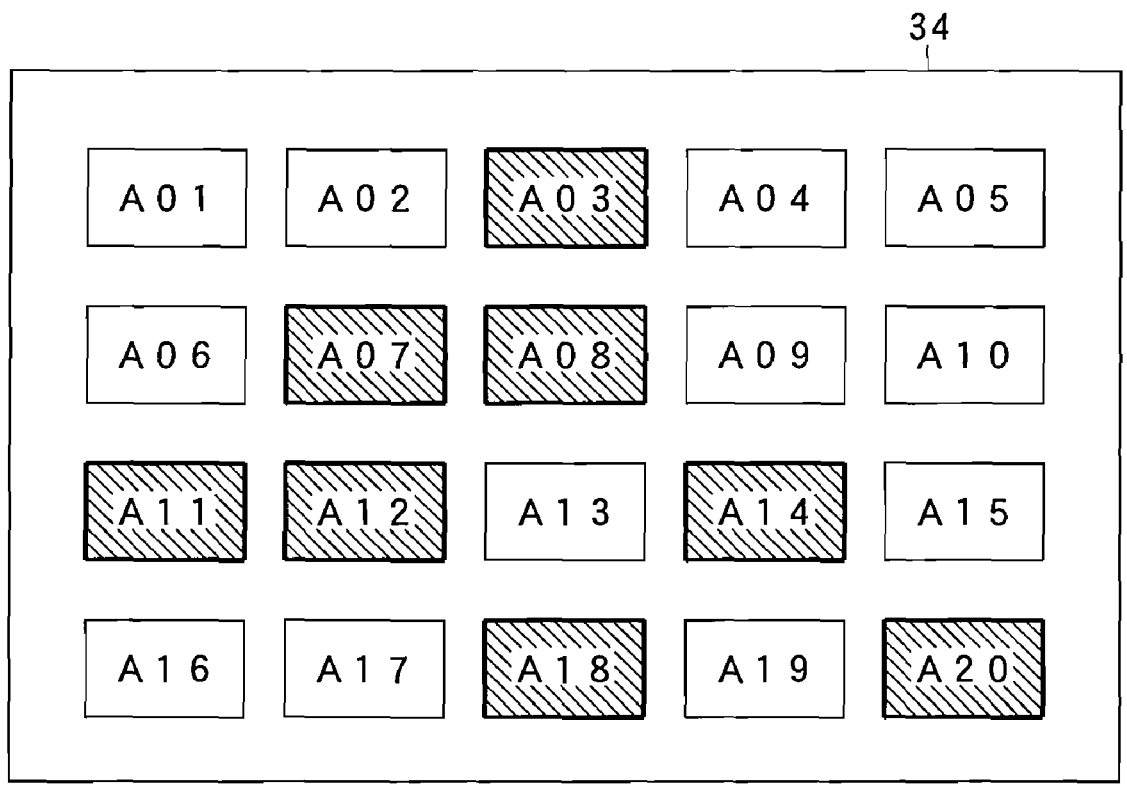
FIG. 6 is a diagram showing a specific operation.

FIG. 6 is a diagram showing the specific operation.

Next, the specific operation will be described. In the following description, the same setting is executed on processing target candidates (apparatuses) A03, A07, A08, A11, A12, A14, A18, A20.

It is assumed that the cursor exists on the processing target candidate A01 under the initial state. The select/release key 42 is pressed at the time point when the rightward cursor shift key 52 is pressed twice to shift the cursor to the processing target candidate A03. As a result, the processing target candidate A03 is set to a selected state (represented by a heavy line frame and a hatched line in FIG. 6), that is, the processing target candidate A03 is selected as a processing target.

Subsequently, when the rightward cursor shift key 52 is further pressed three times, the cursor is shifted to the processing target candidate A04 and then the processing target candidate A05. At this time, it is judged on the time count operation of a timer (provided to the main controller) that the predetermined time or more does not elapse from the previous press operation of the select/release key 42 (the previous processing target search/select operation), and also it is judged that the cursor shift direction is the rightward direction because the cursor is shifted in the increasing order of serial numbers allocated to the apparatuses. Therefore, the cursor is shifted to the leftward end position on the same line and also shifted in the downward direction in which the next processing target candidate is located, so that the cursor is shifted to the processing target candidate A06 on the just lower line.

Then, when the select/release key 42 is pressed at the time point when the rightward cursor shift key 52 is pressed once and the cursor moves to the equipment A07, the equipment A07 is also set to a selected state.

Furthermore, when the select/release key 42 is pressed at the time point when the rightward cursor shift key 52 is pressed once and the cursor moves to the equipment A08, the equipment A08 is also set to a selected state.

Subsequently, when the rightward cursor shift key 52 is pressed three times, the cursor moves to the equipment A09 and then the equipment A10. Since the predetermined time or more does not elapse from the previous press operation of the select/release key 42 (previous processing target search/select operation), the cursor is shifted to the leftward end position on the same line and also shifted in the direction crossing the rightward direction (the present cursor shift direction) to the next processing target candidate, that is, the cursor is further shifted in the downward direction, whereby the cursor is shifted to the processing target candidate A11.

At this time, when the select/release key 42 is pressed, the processing target candidate A11 is also set to a selected state.

Subsequently, when the select/release key 42 is pressed at the time point when the rightward cursor shift key 52 is pressed once to shift the cursor to the processing target candidate A12, the equipment A12 is also set to a selected state. Furthermore, when the select/release key 42 is pressed at the time point when the rightward cursor shift key 52 is pressed twice to shift the cursor to the processing target candidate A14, the processing target candidate A14 is also set to a selected state.

Subsequently, when the rightward cursor shift key 52 is pressed four times, the cursor is shifted to the processing target candidate A15, and at that time the predetermined time or more does not elapse from the previous press operation of the select/release key 42 (the processing target search/select operation), so that the cursor is shifted to the leftward end position and further shifted in the downward direction in which a next processing target candidate is located, whereby the cursor is shifted to the processing target candidate A16 and further shifted in the rightward direction. Finally, the cursor reaches the processing target candidate A18. At this time point, by pressing the select/release key 42, the processing target candidate A18 is also set to a selected state.

Then, when the select/release key 42 is pressed at the time point when the rightward cursor shift key 52 is pressed twice to shift the cursor to the processing target candidate A20, the processing target candidate A20 is set to a selected state (indicated by a heavy line frame and a hatched line in FIG. 6).

As a result of these operations, the equipment A03, the equipment A07, the equipment A08, the equipment A11, the equipment A12, the equipment A14, the equipment A18 and the equipment A20 are set to the selected states, i.e., selected as the processing targets. At this time, the enter key 43 is operated to settle the selection and carry out desired settings, whereby the settings can be performed collectively (in a lump).

In the above operation, an operation record concerning the operation executed by the user (in the above example, the operation means the press operation of the "select/release" key, and the operation record means the record of the press operation) executed by the user, and a cursor shift record concerning the upward, downward, rightward and leftward shifts of the cursor which are connected to the above operation are temporarily stored in the memory (RAM or the like) of the main controller. The operation as shown in FIGS. 5 and 6 is executed on the basis of the data of the operation record and the cursor shift record. The direction of the user's selection of the processing target candidates, i.e., rightward, leftward, upward or downward direction is identified by the cursor shift record. Furthermore, the selection style of the processing target candidates, i.e., selection of the processing target candidates in increasing (decreasing) order of serial numbers or the like is identified by the combination of the processing operation record and the cursor shift record. As described above, the input display device is provided with the timer for counting the time interval between the previous key press operation of the select/release key 42 and the key press operation of the cursor key. If the key press operation of the cursor key when the cursor is located at some right end position is carried out within the predetermined time from the previous key press operation of the select/release key 42 (i.e., the selecting operation of the processing target candidate), the cursor is shifted to the end position of the opposite side and further shifted downwardly to the just lower line.

In the above embodiment, the timer counts the time from the previous key press operation of the selected/release key 42 till the press operation of the cursor key switch. If the count time is not longer than a predetermined threshold time under the state that the cursor is located at the end position in the cursor shift direction on the display screen, the cursor is automatically shifted to the opposite end position in the cursor shift direction and further shifted downwardly to locate at a next processing target candidate. If the count time is not longer than the predetermined threshold time under the state that the cursor is not located at the end position in the cursor shift direction, the cursor is shifted to the right and locates at the next processing target candidate.

Furthermore, if the count time is longer than the predetermined threshold time under the state that cursor is located at the end position in the cursor shift direction on the display screen, the cursor is automatically shifted to the opposite end position in the cursor shift direction on the same line. If the count time is longer than the predetermined threshold time under the state that the cursor is not located at the end position in the cursor shift direction, the cursor may be kept to be located at the present position, or shifted to the opposite end position in the cursor shift direction on the same line.

In place of the time counting operation of the timer described above, the timer may count the time from the previous press operation of any key switch (the cursor shift key, the select/release key, etc.) till the present press operation of any key switch (i.e., the time interval between the subsequent press operations of the same key or different keys (this operation is referred to as "processing target search/select operation"). If it is judged on the time count of the timer that the present key press operation is carried out within a predetermined time from the previous key press operation under the state that the cursor is located at the end position in the cursor shift direction, the cursor is automatically shifted to the opposite end position in the same line and further shifted downwardly to the lower line. On the other hand, if it is judged on the time count of the timer that the present key press operation is not carried out within the predetermined time from the previous key press operation under the state that the cursor is located at the end position in the cursor shift direction, the cursor is automatically shifted to the opposite end position in the same line.

The foregoing description is made on the processing target search/select operation based on the collective settings. However, the same operation may be applied to the processing target search/select operation based on individual settings.

FIG. 7 is a diagram showing the processing target search/select operation based on the individual setting.

FIG. 7 shows a setting screen of fixed holidays. When the select/release key 42 is pressed under the state that the cursor is located at a position $P_{47}$, the corresponding day display "SAT" is reversely displayed, and it is selected to be treated as a fixed holiday. By pressing the enter key 43 under this state, the Saturday of the fourth week is treated as a fixed holiday until the fixed holiday concerned is released.

When the rightward cursor shift key 52 is further operated within a predetermined time from the press operation of the enter key 43, the cursor is moved to a position $P_{51}$ of the next setting value through the processing shown in FIG. 5.

On the other hand, when the rightward cursor shift key 52 is further operated at the stage that the predetermined time elapses from the operation of the enter key 43, the cursor is moved to a position $P_{41}$, as a next setting candidate through the processing shown in FIG. 5.

As described above, according to this embodiment, even when the same cursor shift key is operated, the cursor is moved to the position of a processing target candidate which is estimated to be optimal and selected from plural processing target candidates, so that the labor of the cursor shift operation in the setting processing, etc. is reduced and the setting processing, etc. can be performed efficiently.

In the above embodiment, the processing is associated with the press operation of the key switch. However, the processing of the present invention is not limited to the press operation of the key switch, and any selecting operation of any switch may be adopted as the processing. For example, a touch operation of a touch panel may be adopted as the processing.

What is claimed is:

1. An input display device for enabling a user to input various kinds of information by using a cursor and displaying an input state on a display unit, comprising:

an operation record storing unit for storing a processing target search/select record concerning selection of processing target candidates, and a cursor shift record concerning a cursor shift operation which is carried out on the display unit in connection with the selection of the processing target candidates;

a timer for counting the time from a previous processing target search/select operation till a latest cursor shift operation; and a cursor shift controller for judging on the basis of the processing target search/select record, the cursor shift record and the time counted by the timer whether the latest cursor shift operation is carried out in connection with the same processing to be executed on processing targets, and allowing the cursor to shift to a selectable position of a next processing target candidate if it is judged that the latest cursor shift operation is carried out in connection with the same processing, wherein the selectable positions of the cursor for the processing target candidates are arranged in the form of a grid and the cursor is shifted in a first shift direction on the display unit, and wherein when the latest cursor shift operation in the first shift direction is carried out under the state that the cursor is located at one end position in the first shift direction on the display unit, the selectable position of the next processing target candidate is varied in accordance with whether a predetermined time elapses or not after the cursor reaches the one end position.

2. The input display device according to claim 1, wherein, the cursor shift controller automatically shifts the cursor to the other end position in the first shift direction on the display unit and further shift the cursor in a second direction crossing the first shift direction by one step so that the cursor is allowed to be located at the selectable position of the next processing target candidate when the predetermined time does not elapses after the cursor reaches the one end position.

3. The input display device according to claim 1, wherein the selectable positions of the cursor for the processing target candidates are arranged in the form of a grid, and when the cursor is shifted in a first shift direction on the display unit and the latest cursor shift operation in the first shift direction is carried out under the state that the cursor is located at one end position in the first shift direction on the display unit, the cursor shift controller automatically shifts the cursor to the other end position in the first shift direction on the display unit so that the cursor is allowed to be located at the selectable position of the processing target candidate for different processing when the predetermined time elapses after the cursor reaches the one end position.

4. The input display device according to claim 1, wherein the cursor shift controller compares the time counted by the timer with a predetermined time, and judges that the latest cursor shift operation is carried out in connection with the same processing to be executed on processing targets when the time counted by the timer is within the predetermined time.

5. The input display device according to claim 1, wherein the previous processing target search/select operation is any one of a last cursor shift operation and a last selecting operation of a processing target candidate.

6. A display control method for an input display device for enabling a user to input various kinds of information by using a cursor and displaying an input state on a display unit, comprising:

an operation record storing step for storing a processing target search/select record concerning selection of processing target candidates, and a cursor shift record concerning a cursor shift operation which is carried out on the display unit in connection with the selection of the processing target candidates;

a time counting step for counting the time from a previous processing target search/select operation till a latest cursor shift operation; and a cursor shift controlling step for judging on the basis of the processing target search/select record, the cursor shift record and the time counted in the time counting step whether the latest cursor shift operation is carried out in connection with the same processing to be executed on processing targets, and allowing the cursor to shift to a selectable position of a next processing target candidate if it is judged that the latest cursor shift operation is carried out in connection with the same processing, wherein the selectable positions of the cursor for the processing target candidates are arranged in the form of a grid and the cursor is shifted in a first shift direction on the display unit, and wherein when the latest cursor shift operation in the first shift direction is carried out under the state that the cursor is located at one end position in the first shift direction on the display unit, the selectable position of the next processing target candidate is varied in accordance with whether a predetermined time elapses or not after the cursor reaches the one end position.

7. The display control method according to claim 6, wherein the selectable positions of the cursor for the processing target candidates are arranged in the form of a grid, and when the cursor is shifted in a first shift direction on the display unit and the latest cursor shift operation in the first shift direction is carried out under the state that the cursor is located at one end position in the first shift direction on the display unit, the cursor is automatically shifted to the other end position in the first shift direction on the display unit and further shifted in a second direction crossing the first shift direction by one step so that the cursor is allowed to be located at a selectable position of a next processing target candidate when the predetermined time elapses after the cursor reaches the one end position.

8. The display control method according to claim 6, wherein the selectable positions of the cursor for the processing target candidates are arranged in the form of a grid, and when the cursor is shifted in a first shift direction on the display unit and the latest cursor shift operation in the first shift direction is carried out under the state that the cursor is located at one end position in the first shift direction on the display unit, the cursor is automatically shifted to the other end position in the first shift direction on the display unit so that the cursor is allowed to be located at a selectable position of a processing target candidate for different processing when the predetermined time elapses after the cursor reaches the one end position.

9. The input display method according to claim 6, wherein the time counted in the time counting step is compared with a predetermined time, and it is judged that the latest cursor shift operation is carried out in connection with the same processing to be executed on processing targets when the time counted by the timer is within the predetermined time.

10. The input display method according to claim 6, wherein the previous processing target search/select operation is any one of a last cursor shift operation and a last selecting operation of a processing target candidate.

11. The input display device according to claim 1, wherein the selectable positions of the cursor for the processing target candidates are arranged in the form of a grid, and when the cursor is moved in a first moving direction on the display unit and reaches one end position in the first moving direction on the display unit, the cursor shift controller automatically moves the cursor to the other end position in the first moving direction on the display unit and further moves the cursor in a second direction crossing the first moving direction by one step so that the cursor is allowed to be located at a selectable position of a next processing target candidate.

\* \* \* \* \*